United States Patent [19]

Fleagle

[11] 3,827,760
[45] Aug. 6, 1974

[54] WHEEL SLIP CONTROL SYSTEM FOR AUTOMOTIVE VEHICLES AND THE LIKE

[75] Inventor: Joseph E. Fleagle, Overland, Mo.

[73] Assignee: Wagner Electric Corporation, Parsippany, N.J.

[22] Filed: Jan. 17, 1972

[21] Appl. No.: 218,378

[52] U.S. Cl.............................. 303/21 P, 303/20
[51] Int. Cl............................................... B60t 8/10
[58] Field of Search .......... 188/181; 303/20, 21, 61; 317/5; 324/160–162; 340/52 R, 262, 263

[56] References Cited
UNITED STATES PATENTS

| | | | |
|---|---|---|---|
| 3,494,671 | 2/1970 | Slavin et al......................... | 303/21 P |
| 3,556,610 | 1/1971 | Leiber................................ | 303/21 P |
| 3,578,819 | 5/1971 | Atkins................................ | 303/21 P |
| 3,604,761 | 9/1971 | Okamoto et al............. | 303/21 BE X |
| 3,637,264 | 1/1972 | Leiber et al..................... | 303/21 BE |
| 3,640,588 | 2/1972 | Carp et al.......................... | 303/21 P |
| 3,642,329 | 2/1972 | Zechnall et al................. | 303/21 BE |

Primary Examiner—Milton Buchler
Assistant Examiner—Stephen G. Kunin
Attorney, Agent, or Firm—Eyre, Mann & Lucas

[57] ABSTRACT

A control system for varying the pressure applied to fluid-controlled brake actuating mechanisms upon detection of a predetermined threshold of wheel deceleration brought about by the application of fluid pressure to the brake actuating mechanisms and upon detection of a subsequent, predetermined decrease in wheel rotational velocity. Signals proportional to the velocity and rate of change of velocity of a selected wheel are employed to control the sequence and duration of the energization and de-energization of the solenoid valves in a modulator valve assembly. The incremental decrease in wheel velocity from the time said deceleration threshold is reached, at which time a gradual reduction in brake line fluid pressure is effected, is monitored to determine when a predetermined increment of wheel speed $\Delta v$ has been exceeded, at which time a sharp reduction in brake line pressure is effected. This predetermined increment $\Delta v$ is defined by the value of wheel velocity at the time said deceleration threshold is reached and a variable reference signal which is directly related to the rate of change of wheel speed. The magnitude of $\Delta v$ is inversely related to the magnitude of said reference signal, thereby shortening the period of time between the sensing of said wheel deceleration threshold and the sharp reduction of brake line pressure under road and load conditions which cause wheel velocity to decrease very rapidly upon application of braking force.

26 Claims, 4 Drawing Figures

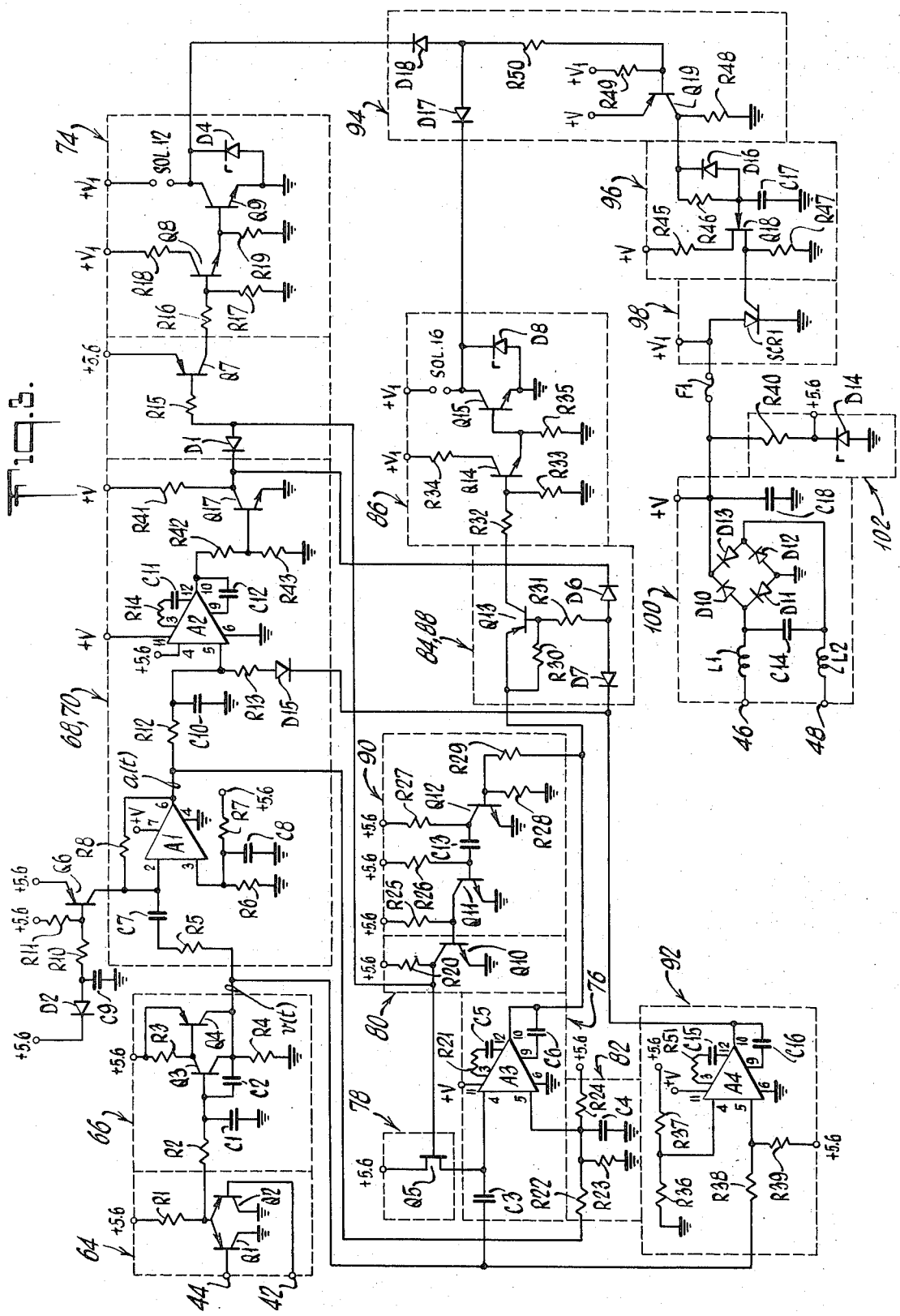

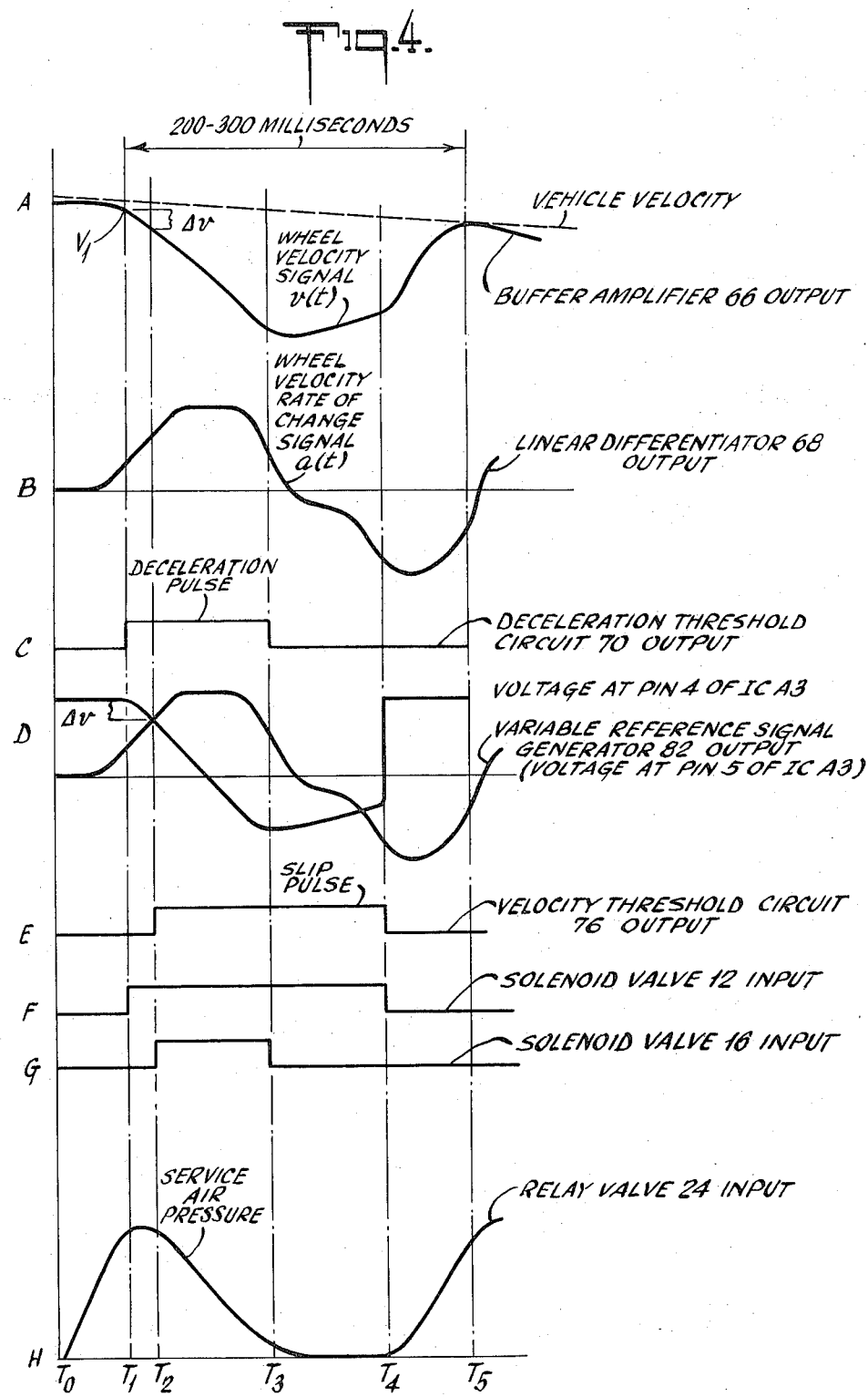

WHEEL SLIP CONTROL SYSTEM FOR AUTOMOTIVE VEHICLES AND THE LIKE

CROSS REFERENCE TO RELATED APPLICATION

The system disclosed herein advantageously incorporates the modulator valve assembly disclosed and claimed in application Ser. No. 218,293 entitled BRAKE ANTI-LOCK MECHANISM filed on even date herewith in the name of John A. Machek.

BACKGROUND OF THE INVENTION

The purpose of the present invention may best be understood with the aid of a brief explanation of the problem which is sought to be overcome. A vehicle's braking system is capable of effecting three different relationships of wheel rotation speed, i.e., the angular velocity of the wheel, to vehicle linear speed. These relationships are: (1) wheel rotation speed synchronized to vehicle linear speed (0 percent wheel slip), i.e., no relative motion between road surface and the portion of the wheel-mounted tire which is in contact with the road surface; (2) wheel rotation speed below synchronization with vehicle linear speed, a condition commonly referred to as wheel slip and quantified by the formula SYNCHRONOUS WHEEL SPEED − ACTUAL WHEEL SPEED × 100 = PERCENT WHEEL SLIP SYNCHRONOUS WHEEL SPEED and (3) wheel not rotating while vehicle is in motion, a condition commonly referred to as wheel skid (100 percent wheel slip). Any driver, by pressing on the brake pedal, can easily produce the first and last of these relationships. It is the second relationship, the wheel rotating below synchronization speed, that is very difficult to obtain even by a very experienced test driver. Road friction variations, vehicle loading and brake sensitivity and stability are several of the major reasons why this state is so difficult to obtain. Therefore, most drivers brake in such a manner that the vehicle wheels are either synchronized to vehicle speed or completely locked. Both of these situations may result in a straightline stop, but there are exceptions. Generally, braked wheels that are synchronously rotating throughout the entire stop will give straight-line stops. Theoretically, locked wheels should also give strightline stops, but frequently do not in actual practice because brakes do not always lock up at the same time. The small initial angular impulse resulting from non-simultaneous lock-up starts the vehicle rotating as it slides. As the center of gravity shifts further and further off center, inertial forces continue to rotate the vehicle. A rotational deviation of approximately 20° between the vehicle centerline and vehicle direction vector makes it almost impossible to regain control. Therefore, maximum controllability can only be achieved with rolling wheels.

It has long been known that a rubber tire has maximum tractive force or "grip" on the road when it is pushed beyond the state of simple static traction, but not so far as to lose all its "gearing" with the road surface. This range of maximum traction occurs when the tire angular speed is below the corresponding linear speed of the vehicle, i.e., when there is some degree of wheel slip. As was pointed out earlier, wheel slip is the most difficult condition to attain. Recent information has also pointed out that impending skid stops on high friction surfaces do not shorten the stopping distance as much as on a low friction surface. On most surfaces, however, it has been found that maximum tractive forces occur when the tire angular speed is at least 10 percent lower than the angular speed at which the tire would be in synchronization with the linear vehicle speed. Therefore, on any given road surface, the shortest stop possible can only be made if this condition is achieved. The purpose of the present invention is to achieve this condition by varying the brake line pressure when the angular deceleration of a braked wheel reaches a predetermined minimum value.

Various prior art patents disclose anti-skid systems having the same goal. In particular, U.S. Pat. No. 3,566,610 issued on Jan. 19, 1971 to Teldix GMBH upon an application filed in the name of Heinz Leiber generally discloses brake control systems for preventing wheel locking. The electronic embodiments disclosed by this patent are, however, capable of reducing brake line pressure only in response to a fixed incremental decrease in wheel speed. Such embodiments do not adjust the reference signal representative of this predetermined incremental decrease in wheel speed.

SUMMARY OF THE INVENTION

The present invention is embodied in and carried out by a wheel-slip control system and various sub-combinations thereof, said system being operative to vary brake line pressure to achieve a desirable percentage of wheel-slip under widely varying conditions of vehicle load weight distribution and varying tire-road interface conditions. This high degree of adaptivity of applicants' wheel-slip control system derives from applicants' novel utilization of signals proportional to wheel velocity and rate of change of wheel velocity to determine when brake line pressure is to be reduced. More specifically, the decrease of the velocity of a selected wheel from the time a predetermined deceleration threshold has been exceeded by that wheel is monitored to determine if a predetermined increment $\Delta v$ has been exceeded, at which time a sharp reduction in brake line fluid pressure is effected. The increment of wheel speed $\Delta v$ is defined by the value of wheel speed at the time said deceleration threshold is exceeded and a reference signal which varies continuously and in direct relationship to the rate of change of wheel speed.

BRIEF DESCRIPTION OF THE DRAWINGS

The present invention may be better understood by reading the written description thereof with reference to the accompanying drawings, of which:

FIG. 3 is a schematic wiring diagram of the signal processing circuitry illustrated generally in FIG. 2; and FIG. 4 comprises a series of graphs representative of values of various significant parameters of the system illustrated in the preceding figures, all of said graphs having a common time base.

DETAILED DESCRIPTION OF THE PREFERRED EMBODIMENT

Figure 1:
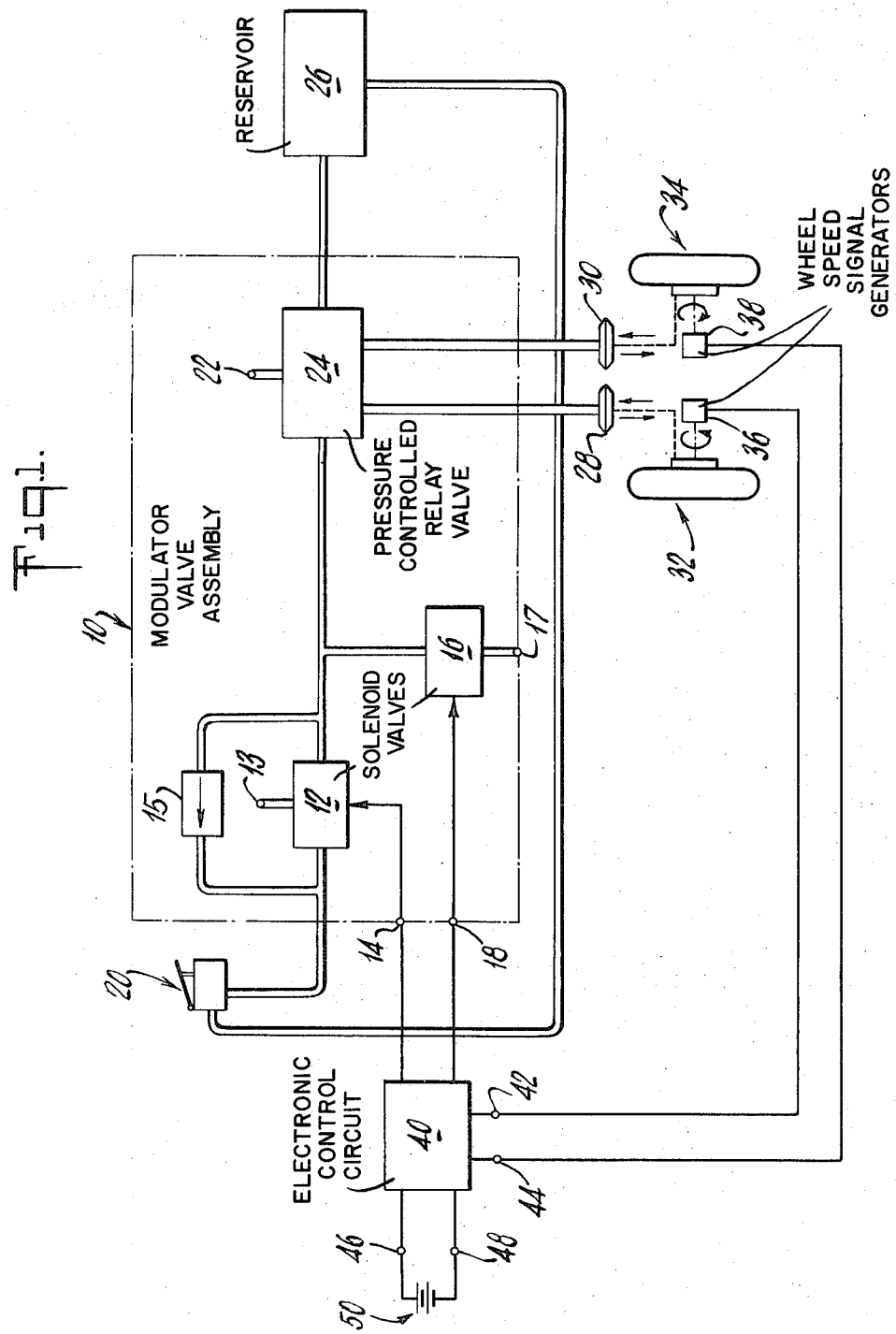
FIG. 1 is an over-all system diagram illustrating generally the electrical and fluid interconnections of the preferred embodiment of the present system.

Referring specifically to the system diagram of FIG. 1, the modulator valve assembly 10 comprises a first solenoid valve 12 having an exhaust orifice 13 and actuatable by the application of electrical power through terminal 14. A check valve 15 is connected between the inlet and outlet ports of solenoid valve 12 to bypass the restricted air passage through orifice 13 when service air pressure is removed from the input port of solenoid valve 12. A second solenoid 16 having a relatively (as compared to orifice 13) unrestricted exhaust orifice 17 is actuatable by the application of electrical power through terminal 18. Both of these solenoid valves 12 and 16 are normally deenergized, thereby allowing the free and undiverted passage of service air from the foot valve 20 through the inlet and outlet ports of solenoid valve 12 to the inlet port of the pressure-controlled relay valve 24. If this rate is too high, the operator's control of the vehicle during hard brake applications is impaired, and the performance of the wheel slip control system is degraded. In response to the service air pressure thus applied, relay valve 24 controls the flow of high-pressure from the reservoir 26 to the air chambers 28 and 30, which actuate the braking mechanisms associated with the wheels 32 and 34, respectively. Connected to these wheels 32 and 34 are wheel speed signal generators 36 and 38, respectively, the analog output signals of which are provided to the electronic control circuit 40 at its signal input terminals 42 and 44, respectively. Power input terminals 46 and 48 have a source of electromotive force such as an automotive battery 50 connected therebetween. The output signals of electronic control circuit 40 are provided to input terminals 14 and 18 of the modulator valve assembly 10.

In operation, the system's solenoid valves 12 and 16 are controlled in terms of the sequence and the duration of their energization and de-energization by the outputs from electronic control circuit 40. In a typical complete cycle of the system, service air pressure is transmitted through de-energized solenoid valve 12 by the actuation of the foot valve 20, thus causing actuation of pressure-controlled relay valve 24. Pressure from reservoir 26 then passes through relay valve 24 to the air chambers 28 and 30, thereby causing the actuation of the braking mechanisms associated with the wheels 32 and 34. The wheels decelerate as a result of the application of braking force, and the electronic control circuit 40 senses this deceleration as well as the decrease in wheel speed. When the deceleration of either wheel 32 or wheel 34 reaches a predetermined threshold, a first output will be generated by electronic control circuit 40 and will be applied to terminal 14, thereby causing energization of solenoid relay 12. Thus, the service air path through relay 12 is now closed, and air is slowly exhausted from the service side of the relay valve 24 through the orifice 13 of solenoid valve 12. Braking force is thus gradually relieved. If the wheel speed and acceleration values are not suitably altered by this gradual decrease in service air pressure to relay valve 24, a second output signal will be generated by electronic control circuit 40 and applied to input terminal 18 and modulator valve assembly 10. This signal energizes solenoid valve 16, which exhausts service air pressure at a much more rapid rate than solenoid 12 due to the different construction in the orifices 17 and 13, respectively, of these two valves. Now the relay valve 24 senses sharply decreasing service air pressure, and responds by closing the path between the air reservoir 26 and the air chambers 28 and 30 and exhausting fluid pressure applied to said chambers through orifice 22 in a relation proportional to the exhaustion of the service fluid pressure from said relay valve. This, in turn, causes a sharp decrease in braking force, allowing the wheels to accelerate toward synchronous velocity. At a predetermined variable threshold, the second output from the electronic control circuit 40 will terminate, thereby causing de-energization of solenoid valve 16. Subsequently, the first output signal applied to terminal 14 will be terminated, thereby causing de-energization of solenoid valve 12. Service air pressure to the relay valve 24 will again rise, causing the reapplication of braking force, and the foregoing cycle will be continuously repeated until either the foot valve 20 is de-actuated, in which case the fluid pressure at the output port of solenoid valve 12 is quickly reduced to zero by means of the check valve 15, or until the synchronous speed of the selected wheel has decreased to a predetermined low level.

It should be noted that it may not be necessary for the system to go through the foregoing complete cycle to achieve the optimum wheel slip condition. When there is a high coefficient of friction between the wheel-mounted tires and the road surface, the actuation of solenoid valve 12 and the consequent gradual reduction in service air pressure to relay valve 24 may be sufficient to achieve the desired degree of wheel slip. Under such circumstances, the second output signal will not be generated by electronic control circuit 40 and solenoid valve 14 will not be actuated.

Figure 2:
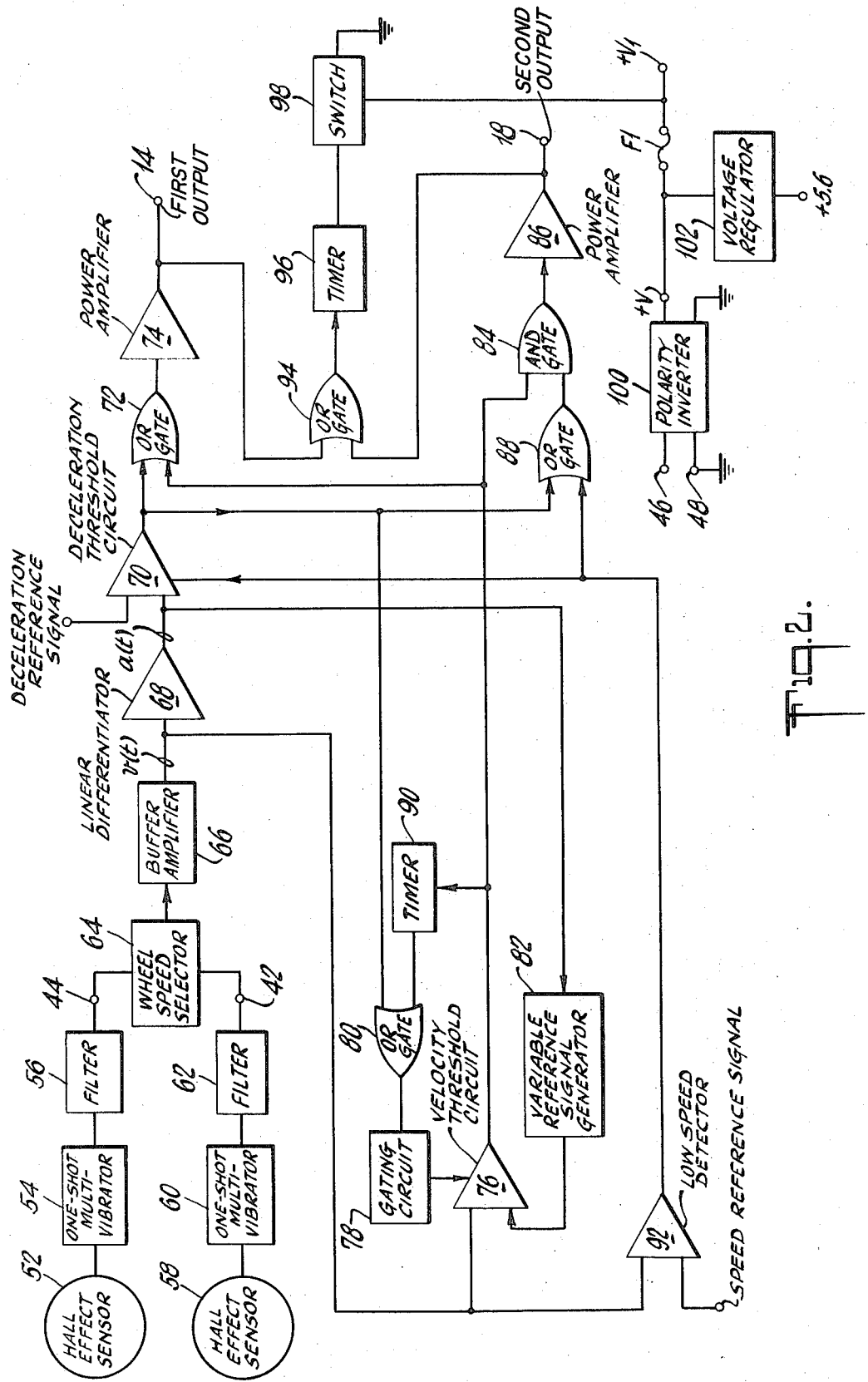
FIG. 2 is a block diagram of the preferred embodiment of the electronic control circuit which generates and processes the wheel speed signals and actuates the solenoid valves shown in FIG. 1.

Referring specifically to the logic diagram shown in FIG. 2, first and second wheel speed signals are generated, the first by hall-effect sensor 52 connected to a first wheel so as to generate a continuous train of pulses varying in frequency in direct proportion to wheel speed. This pulse train is fed into a one-shot multivibrator 54 which in turn generates a variable-frequency train of pulses of constant amplitude and width. This train of standardized pulses is converted to a first wheel speed analog signal by circuit by filter 56. In like manner, a second wheel speed analog signal is generated by hall-effect sensor 58, one-shot multivibrator 60, and filter circuit 62. These wheel speed analog signals may be generated by various other means which are known or may become known in the art. Each of these wheel speed analog signals is fed into wheel speed selector circuit 64 which operates to select the signal representative of the lowest wheel speed for transmission to buffer amplifier 66. Although different selection criteria may be applied, this approach has been found to afford optimum results, particularly in terms of vehicle stability. Thus, a signal $v(t)$ which is proportional to the speed of the slowest-rotating wheel is provided at the output of buffer amplifier 66. This signal is fed to differentiating circuit 68, which in turn generates a signal $a(t)$ proportional to the rate of change of the wheel speed signal $v(t)$. The rate-of-change signal $a(t)$ forms the variable input to deceleration threshold circuit 70, which compares $a(t)$ to a deceleration reference signal which represents a predetermined value of wheel deceleration (preferably −1 g). When the rate-of change signal $a(t)$ exceeds the reference signal, a variable-width pulse is generated by threshold circuit 70. This pulse is fed to one input channel or OR gate 72, which in turn generates a first solenoid-controlling output pulse which is amplified by power amplifier 74 to actuate the solenoid valve 12 of FIG. 1, thereby causing brake line fluid pressure to be slowly decreased.

Meanwhile, the wheel speed analog signal $v(t)$ is continuously fed into velocity threshold circuit 76 which is inoperative to perform any comparison function until actuated by gating circuit 78. The output pulse of deceleration threshold circuit 70 constitutes an input to OR gate 80, the resulting output of which actuates gating circuit 78, thus causing velocity threshold circuit 76 to begin monitoring the decrease in $v(t)$ from the initial value $V_1$ of $v(t)$ at the time gating circuit 78 is actuated. Thus, the initial value $V_1$ is representative of the speed of the selected wheel at the time the deceleration threshold of circuit 70 was reached. As $v(t)$ decreases due to the application of braking force to the wheel, velocity threshold circuit 76 compares the difference between the initial value $V_1$ and the wheel speed analog signal $v(t)$ with a variable reference increment of wheel velocity $\Delta v$. This increment $\Delta v$ is defined by the difference between the stored value $V_1$, which is fixed in any given cycle but varies from cycle to cycle, and the instantaneous value of the output of reference signal generator 82, which increases or decreases as the rate-of-change signal $a(t)$ increases or decreases, respectively. The net effect is to provide a continuously varying reference increment of wheel velocity $\Delta v$ which is inversely related to the rate-of-change signal $a(t)$. Thus, the more rapidly the monitored wheel decelerates upon initial braking, the sooner voltage comparator 76 will produce an output pulse which will be fed to AND gate 84. The second input signal required to cause AND gate 84 to generate an output pulse has already been provided by OR gate 88 in response to the output pulse of deceleration circuit 70. Thus, a second solenoid-controlling output pulse is generated by AND gate 84 and amplified by power amplifier 86, the output of which energizes solenoid valve 16 in FIG. 1.

At this point in the operating cycle, both solenoid valves 12 and 16 have been energized, and brake line fluid pressure has been relieved, first gradually, then sharply. The rate-of-change signal $a(t)$ consequently decreases from its threshold-exceeding value, thereby terminating the output pulse of deceleration threshold circuit 70. As a result, the solenoid-controlling output of power amplifier 86 is also terminated, since the absence of any input to OR gate 88 results in the absence of one necessary input to AND gate 84. This assumes the normal absence of an output pulse from low speed detector 92, the function of which will be explained further on.

The solenoid-controlling output of power amplifier 74 is maintained beyond the termination of the output of power amplifier 86 by application of the output pulse of velocity threshold circuit 76 to an input of OR gate 72. Thus, first solenoid valve 12 remains energized, and brake line fluid pressure is again slowly reduced. As the selected wheel speed increases, the output pulse of velocity threshold circuit 76 will terminate when wheel speed analog signal $v(t)$ reaches a value at which the difference between it and the initial value $V_1$ is less than the now-increasing reference increment $\Delta v$ resulting from the decreasing output of variable reference signal generator 82. As pointed out earlier the magnitude of this reference increment $\Delta v$ is inversely related to the magnitude of the rate-of-change signal $a(t)$. Upon termination of the output pulse of velocity threshold circuit 76, the solenoid-controlling output pulse of OR gate 72 is terminated, resulting in de-energization of the first solenoid valve 12. This completes one full cycle of the signal processing circuit. As this cycle is repeated, decreasing initial values $V_2$, $V_3$, ... $V_n$ of the decreasing wheel speed analog signal $v(t)$ are employed in combination with the continuously varying output of reference signal generator 82 to define $\Delta v$ within each cycle.

The timer 90 is actuated by the initiation of the output pulse of velocity threshold circuit 76. For a predetermined period of time measured from such actuation, preferably about 1.0 second, timing circuit 90 provides an input to OR gate 80 so that gating circuit 78 will remain actuated after termination of the output pulse from deceleration threshold circuit 70, in the event the termination of that output pulse occurs before the output of timer 90 terminates. Thus, comparison of the velocity signal $v(t)$ with the initial value $V_1$ of that signal can continue after the deceleration of the selected wheel falls below the reference threshold of circuit 70. The output pulse of velocity threshold circuit 76 can be terminated by either (1) wheel spin-up beyond the threshold value determined by reference signal generator 82 and initial wheel speed value $V_1$, or (2) termination of the output of timer 90.

Under certain conditions, e.g., on a low-friction surface at low speed, brake fluid line pressure may not be relieved fast enough to prevent a brief wheel lock. This has the undesirable effect of terminating the output pulse of deceleration threshold circuit 70 before brake fluid line pressure has been sufficiently decreased. To overcome this problem, the signal processing circuit includes means for generating an output during those periods of time when the speed of the selected wheel is below a certain value, and employing this output in place of the output which would normally be generated by deceleration threshold circuit 70. Specifically, the low speed detector 92 is operative to generate such an output whenever the speed of the selected wheel drops below a predetermined threshold, preferably about 5 mph. This output is applied to OR gate 88, which in turn provides one of the necessary inputs to AND gate 84. So long as velocity threshold circuit 76 concurrently provides the other necessary input, AND gate 84 will provide an output pulse and the second solenoid valve connected to terminal 18 will be energized. The output of low speed detector 92 is also applied to deceleration threshold circuit 70 so as to prevent generation of an output pulse when synchronous wheel speed is below the predetermined threshold value. The purpose of this feature is to prevent circuit noise, such as that present in the wheel speed signal $v(t)$ at these low speeds, from causing deceleration threshold circuit 70 from generating a spurious output pulse. When synchronous wheel speed is below the predetermined low value of wheel speed represented by the speed reference signal fed into low speed detector 92, the velocity threshold circuit 76 cannot generate an output pulse due to absence of an input to OR gate 80 which controls gating circuit 78. Consequently, one of the necessary inputs to AND gate 84 is absent, preventing energization of the second solenoid valve 16. Since deceleration threshold circuit 70 has been disabled from producing an output pulse, OR gate 72 has no input signal at either terminal, preventing energization of the first solenoid valve 12. Thus, the system is preventing from varying brake line fluid pressure when synchronous wheel speed is below a predetermined low value.

A fail-safe circuit is formed by OR gate 94, timer 96, switch 98 and fuse F1. Whenever an output is produced by either of the power amplifiers 74 and 86, OR gate 94 provides a triggering signal to timer 96. If the triggering signal from OR gate 94 has a longer duration than the inherent delay of the timer 96, switch 98 is actuated to provide a short circuit from the +V supply terminal to circuit ground. Consequently, fuse F1 will be blown by the large current passing therethrough, thereby removing supply voltage from the power amplifiers 74 and 86. Thus, the wheel slip control system is disabled. If the duration of the output of OR gate 94 is shorter than the inherent delay of timer 96 (preferably about 2 seconds), the timer is reset upon termination of its input.

The power supply comprises polarity inverter 100, which provides an output voltage of predetermined polarity regardless of the manner of connection of the source of DC power between power input terminals 46 and 48. This feature allows the control circuit to be employed in either positive-ground or negative-ground vehicles.

A portion of the power output of polarity inverter 100 is fed to voltage regulator 102, which provides a regulated +5.6 VDC output to specific portions of the control circuit, as shown in detail in FIG. 3.

Referring now specifically to the schematic wiring diagram of FIG. 3, the voltage selector 64 is formed by transistors Q1 and Q2 and resistance R1. The unity-gain buffer amplifier 66 is formed by transistors Q3 and Q4, resistances R2, R3 and R4, and capacitances C1 and C2. The voltage derived at the collector of transistor Q4 has an amplitude directly proportional to wheel speed. This output voltage varies between 0 and 4 volts DC over a range of wheel speeds corresponding to a vehicle speed range from 0 to 80 miles per hour.

The integrated circuit A1, resistances R5, R6, R7 and R8 and capacitances C7 and C8 form the linear differentiator 68, which receives the selected wheel velocity analog signal $v(t)$ and produces the wheel velocity rate-of-change signal $a(t)$. The transfer function of the linear differentiator 68 is $$a(t)/v(t) = S.R8.C7/(S.R5.C7) + 1$$

As is apparent from the foregoing formula, linear differentiator 68 has a transmission zero at $f = 0$ and an output which increases at the rate of 20 db per decade of frequency. Thus, as frequency increases, the term S.R5.C7 becomes significant and the gain levels off. The no-signal (zero rate-of-change) output voltage is established by the voltage divider formed by resistances R6 and R7. The output voltage at pin 6 of integrated circuit A1 will be the same as the voltage at pin 3, except for small errors caused by the off-set voltage between pins 2 and 3 and the small bias current drawn at pin 2. The components of the linear differentiator 68 have been chosen so as to make these errors negligible.

The circuit formed by transistor Q6, diode D2, resistances R10 and R11, and capacitance C9 is designed to establish the proper initial conditions upon power turn-on, and to minimize the time required for the linear differentiator 68 to reach the steady state. When power is first applied, transistor Q6 is biased on and clamps pin 2 of integrated circuit A1 at +5.6 volts DC. After approximately 0.1 second, capacitance C9 charges sufficiently through R10 to turn off transistor Q6, which enables the linear differentiator circuit 68 to operate in a steady state condition. Diode D2 provides a rapid discharge path for capacitance C9 when power is removed.

The rate-of-change signal $a(t)$ is coupled through the filter formed by resistance R12 and capacitance C10 to integrated circuit A2, which along with resistance R14 and capacitances C11 and C12 form the deceleration threshold circuit 70. Integrated circuit A2 is an operational amplifier connected to operate as a comparator. Whenever the voltage at pin 5 of A2 becomes greater than the +5.6 volts DC applied to pin 4, pin 10 switches from a low-voltage to a high-voltage state. A threshold voltage representative of a −1g deceleration is established by resistances R6 and R7 connected to pin 3 of integrated circuit A1. Fewer parts are thus required than if the threshold circuit were coupled directly to A2. The output of the linear differentiator 68 increases at the rate of 0.4 volts per g of deceleration. Consequently, the values of R6 and R7 have been chosen to provide an output of +5.2 volts Dc at pin 6 of A1 under no-signal conditions. The threshold value of deceleration may be changed by altering the values of resistances R6 and R7, the ratio of which determines the threshold of integrated circuit A2. Variations in the +5.6 volts DC supply are attenuated by a factor of R7/R6 + R7. Thus, a precisely regulated supply voltage is not required to maintain a reasonably accurate threshold; simple zener diode regulation, as provided in this embodiment, is sufficient.

When the integrated circuit A2 of deceleration threshold circuit 70 produces a positive output pulse, the polarity of this pulse is inverted upon being fed through the voltage divider formed by R42 and R43 to the base of transistor Q17 connected to the junction of said voltage divider resistances. Consequently, the normally high collector of transistor Q17 drops to near circuit ground potential as transistor Q17 is rendered conductive by the output pulse of integrated circuit A2. The cathode of diode D1 is thus similarly placed near circuit ground potential, thereby allowing current to flow from the +5.6 volts DC source across the emitter-base junction of transistor Q7 and through resistance R15, diode D1, and the collector-emitter junction of transistor Q17. This current flow renders transistor Q7 conductive, and current flows from the +5.6 volts DC source across the emitter-collector junction of transistor Q7 through the voltage divider formed by resistances R16 and R17. The positive voltage thus developed at the junction of resistances R16 and R17 is applied to transistor Q8, which is thereby rendered conductive to cause solenoid-controlling transistor Q9 to become conductive. Zener diode D4 is connected between the collector-emitter terminals of transistor Q9 in order to limit the inductive kickback from the solenoid to a sufficiently low value to avoid damage to the power transistor Q9. Corresponding elements in power amplifiers 74 and 86 function in like manner.

The low level at the collector of transistor Q17 is also applied to the cathode of diode D6 in the combined AND and OR gates 84, 88. This constitutes an input to OR gate 88, which in turn provides one of the necessary inputs to AND gate 84. The other necessary input to AND gate 84 will be provided by the velocity threshold circuit 76 in the manner described below.

The gating circuit 78 comprising junction field effect transistor (FET) Q5 is rendered non-conductive by the decrease in voltage at its gate effected by the reduction in voltage at the collector of transistor Q17, to which the gate of FET Q5 is connected through diode D1. Consequently, pin 4 of integrated circuit A3 is no longer held at +5.6 volts DC, and from this point in time wheel velocity analog signal $v(t)$ is fed through capacitance C3 to pin 4. Integrated circuit A3 acts as a comparator of the voltages appearing at pins 4 and 5. Since this circuit is effectively deactuated when FET Q5 is conductive, such comparison is carried out only during the interval in which FET Q5 is non-conductive. The capacitances C5 and C6 and resistance R21 form compensating circuits for A3. Variable reference signal generator 82 comprises capacitance C4 and resistances R22, R23 and R24. A regulated +5.6 volts DC is fed through R24 to the parallel-connected capacitance C4 and resistance R23, while the wheel velocity rate of change analog signal $a(t)$ is fed through resistance R22. The variable voltage thus developed at the high side of capacitance C4 is fed to pin 5 of integrated circuit A3. This variable input voltage at pin 5 of A3 becomes more positive upon deceleration, and less positive upon acceleration of the selected wheel. The more positive pin 5 becomes, the smaller $\Delta v$ (the reference increment of wheel speed) becomes, and the less positive pin 5 becomes, the larger $\Delta v$ becomes. The output of integrated circuit A3 is derived at pin 10, which is normally at a low voltage. When the voltage at pin 4 becomes less positive than pin 5, pin 10 goes from a low voltage to a higher voltage. Pin 10 remains at this higher voltage until the voltage at pin 4 becomes more positive than the continuously varying reference voltage at pin 5. The variable-width output pulse thus developed at pin 10 of A3 is fed to combined AND and OR gates 84, 88 as the other necessary input to AND gate 84, the first such input being provided by OR gate 88 in response to the variable-width output pulse of deceleration threshold circuit 70 derived at the collector of Q17. Transistor Q13 is thus rendered conductive and passes the output pulse of A3 to power amplifier 86, causing solenoid 16 to be energized.

In the present circuit, the variable voltage output of reference signal generator 82 changes by 50 millivolts (representative of 1 mph) for each $g$ of deceleration or acceleration. The degree of rate compensation can be adjusted by varying the values of resistances R22, R23 and R24. The rate compensation feature is very important in the operation of applicant's wheel slip control system for several reasons. First, the rate at which vehicle wheel velocity departs from synchronous velocity depends on factors such as service air pressure rise rate, road coefficient, load size and distribution, etc. Also, there is an unavoidable delay between the time an electrical signal is provided to the modulator valve assembly and the actual reduction in braking force which results. For all of these reasons, it is virtually impossible to achieve a uniform degree of slip from cycle to cycle. The wheel may lock completely under a first group of conditions, and may not develop enough slip for optimum braking under a second group of conditions. The rate compensation feature enables the system to effectively predict the proper time to relieve pressure in order to develop the optimum wheel slip. Similarly, this feature enables the system to pick the proper time at which to reapply braking force. The result is more uniform operation of the system from cycle to cycle, with the degree of wheel slip achieved in each cycle being much closer to the optimum value than it would be without rate compensation.

In addition, the rate compensation feature overcomes a fundamental problem associated with this type of system. It will be recalled that brake re-application is based on spin-up of the wheel past the initial value $V_1$ of the wheel speed analog signal $v(t)$. However, that information is anywhere from 0.2 to 0.6 second old at the time when braking force is reapplied, and the vehicle velocity may well have decreased substantially during that interval so that the accelerating wheel will never be able to reach the stored value of velocity. This state of affairs is commonplace when braking force is applied while the vehicle is travelling over high-coefficient surfaces where vehicle decelerations are relatively large. However, under these conditions, the wheels accelerate very rapidly upon reduction of braking force. The resulting large acceleration voltage fed to the variable reference signal generator 82 causes the variable reference increment of wheel speed $\Delta v$ to become relatively large, thereby requiring very little wheel spin-up to terminate the variable-width output pulse of the velocity threshold circuit 76.

The timer 90 receives the output pulse appearing at pin 10 of integrated circuit A3 through the resistor R29, and Q12 is consequently rendered conductive. The negative-going pulse appearing at the collector of transistor Q12 is applied through capacitance C13 to the base of transistor Q11, which is thereby rendered non-conductive. Capacitance C13 thus begins recharging through resistance R26. While transistor Q11 remains non-conductive, transistor Q10 of OR gate 80 is rendered conductive since current flowing through resistance R25 is no longer diverted from the base-emitter junction of Q10. As a result, the collector of Q10 goes low, thereby driving the gate of FET Q5 low. Also, the voltage at the junction of R15 and D1 in OR gate 72 is driven low. In this fashion, the output pulse appearing at pin 10 of integrated circuit A3 is indirectly transmitted to OR gate 72. The need for intermediate buffering circuitry between the output of velocity threshold circuit 76 and the input to OR gate 72 is obviated, as a result.

The low speed detector 92 comprises integrated circuit A4 and the compensating circuits formed by resistance R51 and capacitances C15 and C16. The fixed input voltage to pin 4 is derived from the junction of resistances R36 and R37 connected in series between the +5.6 volts DC source and circuit ground. The variable input to pin 5 is derived from the junction of resistances R38 and R39 connected in series between the collector of Q4 in buffer amplifier 66 and the +5.6 volts DC source. The four resistances R36, R37, R38 and R39 provide a quasi-Wheatstone bridge, and the integrated circuit A4 is employed as a differential comparator. Under normal conditions, i.e., when selected wheel speed is above the predetermined threshold, the output of the low speed detector 92 derived at pin 10 of integrated circuit A4 is normally high. However, when the wheel speed analog signal $v(t)$ drops below the threshold value determined by the ratio of resistances R38 and R39, pin 10 of integrated circuit A4 goes low, thereby placing the cathodes of diodes D7 and D15 at a low voltage. As a result, pin 5 of integrated circuit A2 is clamped at approximately +1.6 volts, thereby preventing the rate of change signal $a(t)$ from causing integrated circuit A2 to generate an output pulse. Also, the low voltage at the cathode of diode D7 comprises an input to OR gate 88, which in turn provides one of the necessary inputs to AND gate 84. Consequently, in a situation in which the selected wheel locks up, during an anti-lock cycle, thereby terminating the generation of an output pulse by deceleration threshold circuit 70, brake pressure will nevertheless be sharply relieved as a coincidence of the slip pulse from velocity threshold circuit 76 and the output pulse of OR gate 88 resulting from the input provided by low speed detector 92. At synchronous wheel speeds below 5 miles per hour, it has been found desirable to shut off the threshold circuit 70 to prevent it from generating a spurious output pulse in response to noise present in the sensor signal at these low speeds. When wheel speed is below the predetermined level, integrated circuit A4 has a low-voltage output. With the cathode of diode D15 is placed at this low voltage, pin 5 of integrated circuit A2 is clamped at approximately +1.6 volts DC, thereby preventing the rate-of-change signal $a(t)$ from causing integrated circuit A2 to generate an output.

In the fail-safe circuit, the OR gate 94 detects the energization of either of solenoid valves 12 or 16 by sensing a low voltage at the collector of transistor Q9, which is applied to the cathode of diode D18, or a low voltage at the collector of transistor Q15, which is applied to the cathode of diode D17. In either event, transistor Q19 is rendered conductive to the point of saturation, with the resultant high voltage at its collector being applied to a timer 96. Capacitance C17 charges through resistance R46, and when the voltage across C17 reaches a predetermined value equal to a fixed fraction of the interbase voltage of unijunction transistor Q18, UJT Q18 switches from a non-conductive to a conductive state. A high voltage is thus applied to the gate of silicon controlled rectifier 1, causing it to become conductive and to short-circuit the output of polarity inverter 100 to ground through fuse F1. The sharply increased current through fuse F1 causes same to blow out, thereby removing supply voltage $V_1$ from the power amplifiers 74 and 86. The various elements of timer 96 are chosen to provide a time delay of approximately 2 seconds from the time either input channel to OR gate 94 detects the energization of a solenoid valve. Obviously, this time delay can be readily varied by adjusting the values of resistance R46 and capacitance C17. The diode D16 across resistance R46 provides a rapid discharge path for C17 when Q19 turns off. This prevents successive cycles of the unit from incrementally increasing the voltage across C17 to the point where the cumulative voltage across C17 is high enough to cause UJT Q18 to fire.

The polarity inverter 100 is of conventional design, and forms no essential part of the invention. The output voltage +V is approximately 1.2 volts less than the +12 volts DC impressed across input terminals 46 and 48 as a result of internal losses. Voltage regulator 102 is likewise of conventional design, comprising current limiting resistance R40 and zener diode D14 in series, the values of which have been selected to provide +5.6 volts DC at the junction thereof.

The values of the various components of the circuit shown in FIG. 3 are as follows:

Resistances

R1 — 6.8K ohms
R2 — 15K ohms
R3 — 15K ohms
R4 — 470 ohms
R5 — 4.7K ohms
R6 — 46.4K ohms
R7 — 3.48K ohms
R8 — 392K ohms
R10 — 33K ohms
R11 — 100K ohms
R12 — 15K ohms
R13 — 470 ohms
R14 — 1.5K ohms
R15 — 15K ohms
R16 — 1K ohms
R17 — 15K ohms
R18 — 120 ohms
R19 — 1K ohms
R20 — 10K ohms
R21 — 1.5K ohms
R22 — 15K ohms
R23 — 100K ohms
R24 — 2.2K ohms
R25 — 33K ohms
R26 — 680K ohms
R27 — 4.7K ohms
R28 — 3.6K ohms
R29 — 15K ohms
R30 — 15K ohms
R31 — 33K ohms
R32 — 3.6K ohms
R33 — 15K ohms
R34 — 120 ohms
R35 — 1K ohms
R36 — 10K ohms
R37 — 10K ohms
R38 — 8.45K ohms
R39 — 10K ohms
R40 — 68 ohms
R41 — 10K ohms
R42 — 22K ohms
R43 — 4.7K ohms
R45 — 470 ohms
R46 — 150K ohms
R47 — 100 ohms
R48 — 4.7K ohms
R49 — 15K ohms
R50 — 33K ohms Integrated Circuits

A1 — AD502J
A2 — MC1709L
A3 — MC1709L
A4 — MC1709L

Diodes

D1 — 1N914
D2 — 1N914
D4 — 1N4754
D6 — 1N914
D7 — 1N914
D8 — 1N4754
D10 — 1N4998
D11 — 1N4998
D12 — 1N4998
D13 — 1N4998
D14 — 1N4734A
D15 — 1N914
D16 — 1N914
D17 — 1N914
D18 — 1N914

Capacitances

C1 — 1 microfarad
C2 — 0.047 microfarad
C3 — 1 microfarad
C4 — 1 microfarad
C5 — 0.005 microfarad
C6 — 100 picofarads
C7 — 1 microfarad
C8 — 5 microfarads
C9 — 0.47 microfarad
C10 — 0.47 microfarad
C11 — 0.005 microfarad
C12 — 100 picofarads
C13 — 1 microfarad
C14 — 0.047 microfarad
C15 — 0.005 microfarad
C16 — 100 picofarads
C17 — 5 microfarads
C18 — 250 microfarads Inductances L1 — 4 microhenries
L2 — 4 microhenries Transistors Q1 — 2N4250
Q2 — 2N4250
Q3 — 2N3565
Q4 — 2N4250
Q5 — 2N4220
Q6 — 2N4250
Q7 — 2N4250
Q8 — 2N3567
Q9 — 2N3567
Q10 — 2N3565
Q11 — 2N3565
Q12 — 2N3567
Q13 — 2N4250
Q14 — 2N3567
Q15 — 2N3567
Q17 — 2N3567
Q18 — 2N4871
Q19 — 2N4250

Silicon Controlled Rectifier

SCR1 — C106A1

Referring now specifically to FIG. 4, graph A depicts the selected wheel velocity analog signal $v(t)$, which is the output of buffer amplifier 66, and the relationship of this wheel velocity to the linear velocity of the vehicle during one complete cycle of the wheel slip control system as described herein. The wheel velocity rate-of-change analog signal $a(t)$, which is the output of linear differentiator 68, is represented by graph B. The output of the deceleration threshold circuit 70 is represented by graph C. The continuously variable, positive-polarity output of reference signal generator 82 is shown in graph D superimposed on the voltage at pin 4 of integrated circuit A3 in velocity threshold circuit 76, the output of which is represented by graph E. The inputs to solenoid valves 12 and 16 are represented by graphs F and G, respectively. The value of the service air pressure at the inlet port of relay valve 24 is represented by graph H.

In the course of a complete cycle as described in connection with FIG. 2, the application of braking force is initiated at time $T_0$ by the actuation of foot valve 20. Service air pressure consequently begins to rise at a rapid, substantially steady rate. As braking force becomes increasingly greater, the selected wheel decelerates more rapidly and begins to slip, i.e., to fall below synchronous velocity. When deceleration of this wheel reaches the predetermined threshold (preferably $-1g$) at $T_1$, deceleration threshold circuit 70 will initiate a deceleration pulse (graph C). With the initiation of the deceleration pulse (graph F) at time $T_1$, the first solenoid valve 12 is energized. As deceleration increases (graph B), the directly related output of the variable reference signal generator 82 also increases (graph D), thereby causing the variable reference increment of wheel velocity $\Delta v$ to decrease. At time $T_1$, the velocity threshold circuit 76 begins to compare the difference between the wheel velocity analog signal $v(t)$ and the initial value $V_1$ thereof at time $T_1$ to the continuously variable reference increment of wheel velocity $\Delta v$. As $v(t)$ continues to decrease, this signal falls below the output of reference signal generator 82 (graph D), at time $T_2$, and velocity threshold circuit 76 initiates generation of a slip pulse. Simultaneously, the second solenoid valve 16 is energized (graph G). The service air pressure (graph H), which was slowly decreased during the time interval $T_1 - T_2$, is now sharply decreased until the deceleration of the selected wheel is less than the predetermined threshold of deceleration threshold circuit 70. Thus, at time $T_3$, the deceleration pulse (graph C) is terminated, and simultaneously the energization of the second solenoid valve 16 is terminated. Service air pressure continues to be relieved at a gradual rate until time $T_4$, at which time $v(t)$ becomes greater than the output of reference signal generator 82 and the slip pulse is consequently terminated. Simultaneously, the first solenoid valve 12 is de-energized. Although service air pressure at the inlet port of relay valve 24 begins to build from time $T_4$, rapid wheel spin-up takes place because the inertia of the braking apparatus introduces a time delay between the application of service air pressure and the application of braking force, and the wheel approaches synchronous velocity. At time $T_5$, the wheel begins to decelerate again as a result of the re-application of braking force, and the foregoing cycle is repeated until either the vehicle velocity has been reduced to a predetermined low value or service air pressure is removed from the inlet port of solenoid valve 12 by de-actuation of foot valve 20.

A number of significant advantages are afforded by the wheel slip control system described herein. Specifically, by means of rate compensation, the system provides a more uniform degree of slip from cycle to cycle for varying road coefficients and load values and distribution. Another important feature is the variation of brake reapplication time, which is determined by wheel velocity, wheel acceleration, and the value of wheel speed at the time skid commenced in each cycle of the system. This advantage is also derived from the rate compensation feature, i.e., the provision of a variable reference signal representative of a varying $\Delta v$ to the velocity threshold circuit. Also, the system provides a high degree of immunity to noise, i.e., sudden decelerations which do not result in a substantial change in wheel speed. Such decelerations may be caused by bumps in the road, peculiarities of the vehicles' suspension system and flexing of the wheel-mounted tires. Such noise causes only the primary solenoid to be briefly actuated, thereby minimizing the effect on braking force. Larger wheel velocity changes which indicate a true skid cause the secondary solenoid to be actuated and thereby effecting a substantial relief of service air pressure and consequently braking force. Also, air usage is minimized by limiting air exhaust to an amount just sufficient to relieve braking force. As previously explained, the rapid exhaust of service air pressure is terminated as soon as the deceleration of the selected wheel no longer exceeds the predetermined deceleration threshold, and only a slow exhaust of service air pressure is thereafter effected until wheel slip is suitably reduced.

These and other advantages of the present invention, as well as certain changes and modifications of the disclosed embodiment thereof, will be readily apparent to those skilled in the art. For example, simple DC generators could be employed in lieu of the combinations of Hall-effect sensor, one-shot multivibrator, and filter to provide a voltage which is proportional to the speed of each vehicle wheel. In addition, rather than select one of a plurality of wheel speed signals as the input to the electronic control circuitry, a single, selected wheel assembly could be fitted with a single-generating means to provide a signal directly to the buffer amplifier of applicant's system, thereby obviating the need for a wheel speed selector. The auxiliary circuit for establishing proper initial conditions for the linear differentiator 68 could be removed. The disclosed embodiment could also be reduced to more basic configurations by elimination of various component circuits. For example, the timer 90 could be removed, with the output of velocity threshold circuit 76 then being fed directly to OR gate 80. Also, low speed detector 92 and OR gate 88 could be eliminated, the output of deceleration threshold circuit 70 then being fed directly as an input to AND gate 84. As a further example, the fail-safe circuitry comprising OR gate 84, timer 96 and switch 98 could be eliminated without rendering the system inoperative. Other modulator valve assemblies having different operational capabilities adapted to particular applications may be employed in combination with the disclosed circuitry in lieu of the cross-referenced device. For example, it may be advantageous to decrease the rate of increase of service air pressure in response to the first output of the circuitry, rather than gradually decrease the service air pressure. Also, it is not necessary that the modulator valve assembly be unitary; it may be formed from various discrete components. It is the applicant's intention to cover all those changes and modifications which could be made to the embodiment of the invention herein chosen for the purposes of the disclosure without departing from the spirit and scope of the invention.

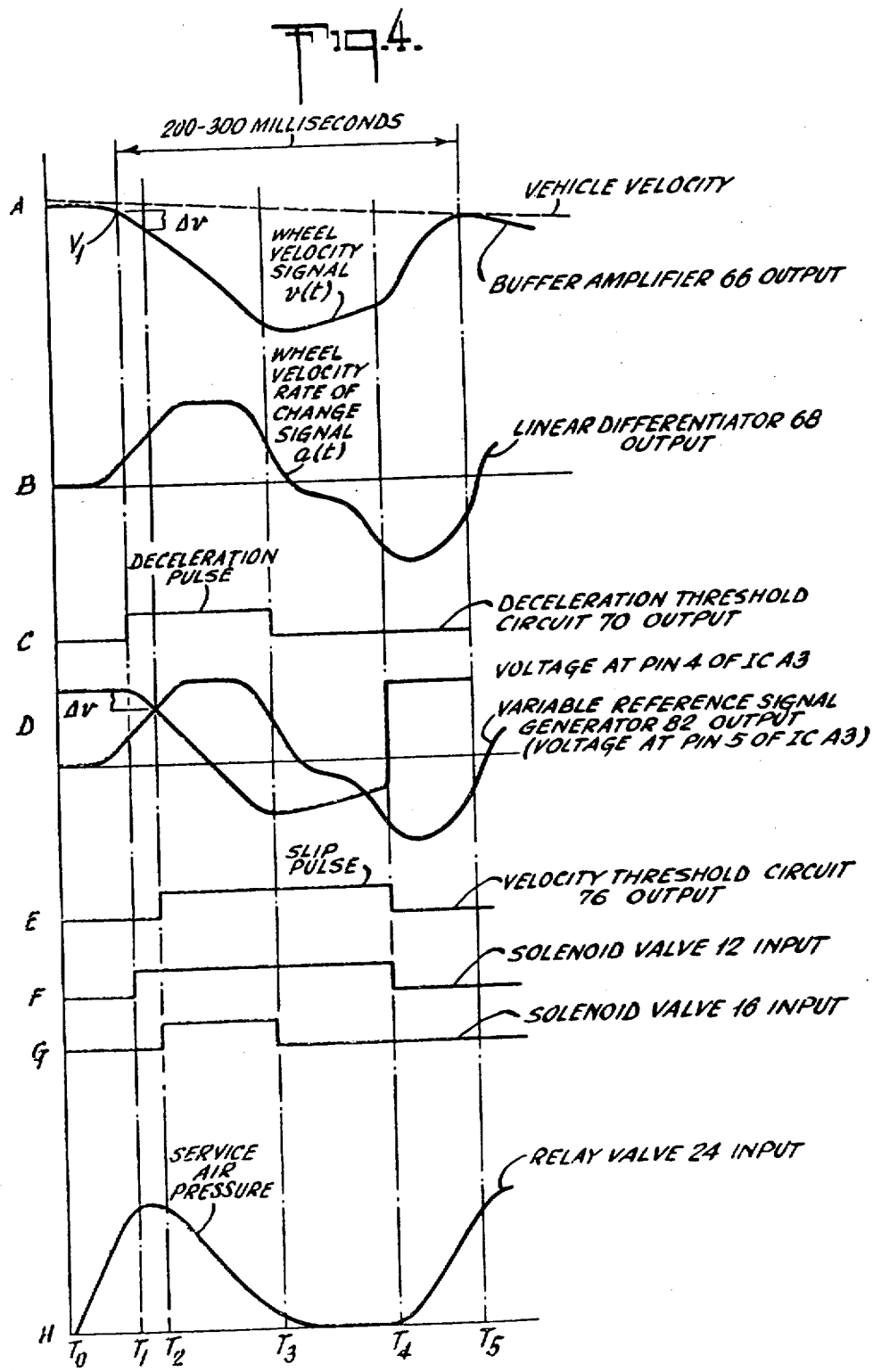

What is claimed is:

1. A wheel slip control system for a vehicle having at least one wheel with associated braking means, comprising:
   1. first means operative to generate a first output whenever (a) the rate of change of rotational velocity of a selected wheel exceeds a predetermined threshold or (b) the change in rotational velocity of the selected wheel, from the value of said rotational velocity at the time said rate of change of rotational velocity exceeds said predetermined threshold, exceeds a variable reference increment of wheel speed, said first means being further operative to generate a second output whenever (a) the rate of change of rotational velocity of a selected wheel exceeds a predetermined threshold and (b) the change in rotational velocity of the selected wheel, from the value of said rotational velocity at the time said rate of change of rotational velocity exceeds said predetermined threshold, exceeds said variable reference increment of wheel speed; and
   2. second means operative in response to at least said second output to effect a decrease in the braking force applied to at least said selected wheel.
2. The system according to claim 1 wherein said variable reference increment of wheel speed is inversely related to said rate of change of rotational velocity.
3. A wheel slip control system for a vehicle having at least one wheel with associated braking means, comprising:
   1. first means operative to generate a first variable-width pulse when the rate of change of the rotational velocity of a selected wheel exceeds a predetermined threshold, and further operative to generate a second variable-width pulse when the change in rotational velocity of the selected wheel from the value of said rotational velocity at the time said first variable-width pulse is initiated exceeds a variable reference increment of wheel speed; and
   2. second means operative to receive said first and second variable-width pulses, and further operative at least in response to the coincidence of said first and second variable-width pulses to effect a decrease in the braking force applied to at least said selected wheel.
4. The system according to claim 3 wherein said variable reference increment of wheel speed is inversely related to said rate of change of rotational velocity.
5. The system according to claim 3 wherein said first means comprises:
   1. first signal means operative to generate a first signal directly proportional to the rotational velocity of said selected wheel;
   2. second signal means operative to generate a second signal directly proportional to the rate of change of rotational velocity of said selected wheel;
   3. first comparison means operative to generate said first variable-width pulse whenever said rate of change of the rotational velocity of said selected wheel exceeds said predetermined threshold;
   4. variable reference signal generator means operative to receive said second signal and to generate a variable reference signal directly related to said second signal, the difference between the value of said first signal at the time of initiation of said first variable-width pulse and said variable reference signal being representative of said variable reference increment of wheel speed; and
   5. second comparison means operative to receive said first signal and said variable reference signal and to generate a second variable-width pulse whenever the difference between said first signal and its value at the time of initiation of said first variable-width pulse exceeds said variable reference increment of wheel speed.
6. The system according to claim 5 comprising gating circuit means operative in response to initiation of said first variable-width pulse to cause said second comparison means to initiate its comparison function.
7. The system according to claim 6 further comprising:
   1. timer means operative to generate an output for a predetermined delay time after the initiation of said second variable-width pulse; and
   2. first logic means operative in response to either said first variable-width pulse or said timer output to actuate said gating circuit means.
8. The system according to claim 7 wherein said timer means is further operative to reset itself when said second variable-width pulse is of shorter duration than said predetermined delay time.
9. The system according to claim 5 wherein said system further comprises low speed detector means operative to receive a reference signal and said first signal and, whenever said rotational velocity of said selected wheel falls below a predetermined minimum speed, to generate a disabling signal which prevents generation of said first variable-width pulse.
10. The system according to claim 3 wherein said second means comprises:
    1. first output means operative to generate a first output in response to either of said first or second variable-width pulses;
    2. second output means operative to generate a second output in response to the coincidence of said first and second variable-width pulses; and
    3. valve means operative in response to at least said second output to effect a decrease in the braking force applied to at least said selected wheel.
11. The system according to claim 10 wherein said valve means is operative in response to said first output to effect a gradual decrease in the braking force applied to at least said selected wheel, and is further operative in response to said second output to effect a sharp decrease in the braking force applied to at least said selected wheel.
12. The system according to claim 11 wherein said second output means comprises:
    1. third logic means operative in response to the coincidence of said first and second variable-width pulses to provide an input to
    2. second power amplifier means operative to actuate said valve means so as to effect said sharp decrease in the braking force applied to at least said selected wheel.
13. The system according to claim 10 wherein said first output means comprises:
    1. second logic means operative in response to either said first or second variable-width pulses to provide an input to
    2. first power amplifier means operative to actuate said valve means so as to effect said gradual decrease in the braking force applied to at least said selected wheel.

14. The system according to claim 10 wherein said system further comprises low speed detector means operative, whenever said rotational velocity of said selected wheel falls below a predetermined minimum speed, to provide a substitute signal to said second output means in lieu of said first variable-width pulse.

15. The system according to claim 14 wherein said low speed detector means comprises:
   1. third comparison means operative to receive said first signal and a predetermined reference signal representative of a minimum value of wheel speed, and to generate an output whenever said first signal falls below said predetermined reference signal; and
   2. fourth logic means operative in response to either said output of said third comparison means or said first variable-width pulse to provide a first necessary input to said second output means, the second necessary input consisting of said second variable-width pulse.

16. The system according to claim 10 wherein said system further comprises fail-safe circuit means operative to disable said wheel slip control system in response to either a first or second output having a duration in excess of a predetermined period of time.

17. The system according to claim 16 wherein said fail-safe circuit means comprises:
   1. fifth logic means operative to generate an output in response to either said first or second output;
   2. timer means operative to generate an output a predetermined delay time after the initiation of the output of said fifth logic means; and
   3. switching means operative to short-circuit the source of power to ground through a fuse in response to the output of said timer means, thereby causing said fuse to open the connection of said power source to at least a portion of said wheel slip control system.

18. A method of controlling the degree of slip of at least one brakeable vehicle wheel, comprising essentially the steps of:
   1. monitoring the speed of said wheel;
   2. monitoring the rate of change of the speed of said wheel;
   3. generating a variable reference increment of wheel speed;
   4. modifying the rate of change of braking force at least during each period of time in which said rate of change of wheel speed exceeds a predetermined threshold; and
   5. reducing braking force at least during each period of time in which the reduction in wheel speed exceeds said variable reference increment of wheel speed; said reduction in wheel speed being measured from the value of wheel speed at the time the rate of change of wheel speed exceeds a predetermined threshold.

19. The method according to claim 18 wherein said continuously varying reference increment of wheel speed is inversely related to the rate of change of the speed of said wheel.

20. The method according to claim 18 wherein said step of modifying the rate of change of braking force comprises the step of gradually reducing the braking force after the rate of change of wheel speed has exceeded the predetermined threshold.

21. The method according to claim 20 wherein braking force is sharply reduced during each period of time in which the reduction in wheel speed exceeds said variable reference increment of wheel speed.

22. The method according to claim 18 wherein said step of reducing braking force at least during said periods of time is performed continuously after the rate of change of wheel speed first exceeds said predetermined threshold as a result of the application of braking force until a predetermined low value of wheel speed is reached.

23. The method according to claim 18 wherein the monitored vehicle wheel is the wheel having the lowest velocity.

24. The method according to claim 18 wherein said step of reducing braking force comprises the step of initiating the reduction of braking force after the rate of change of wheel speed exceeds said predetermined threshold.

25. The method according to claim 18 wherein said step of reducing braking force comprises the step of initiating the reduction of braking force after said reduction in wheel speed exceeds said variable reference increment of wheel speed.

26. The method according to claim 18 wherein said step of reducing braking force comprises the step of terminating the reduction of braking force after the wheel speed increases to a value which does not differ from the value of wheel speed at the time the rate of change of wheel speed exceeded said predetermined threshold by more than said variable reference increment of wheel speed.

* * * * *

UNITED STATES PATENT OFFICE
CERTIFICATE OF CORRECTION

Patent No. 3,827,760          Dated August 6, 1974

Inventor(s) Joseph E. Fleagle

It is certified that error appears in the above-identified patent and that said Letters Patent are hereby corrected as shown below:

Col. 18, Line 10 - Claim 19: "continuously varying reference increment" should read --variable reference increment--

Signed and sealed this 29th day of October 1974.

(SEAL)
Attest:

McCOY M. GIBSON JR.
Attesting Officer

C. MARSHALL DANN
Commissioner of Patents

UNITED STATES PATENT OFFICE
CERTIFICATE OF CORRECTION

Patent No. 3,827,760             Dated August 6, 1974

Inventor(s) Joseph E. Fleagle

It is certified that error appears in the above-identified patent and that said Letters Patent are hereby corrected as shown below:

Figure 4 should read as shown on the attached sheet.

Signed and Sealed this

*third* Day of *February 1976*

[SEAL]

*Attest:*

RUTH C. MASON
*Attesting Officer*

C. MARSHALL DANN
*Commissioner of Patents and Trademarks*

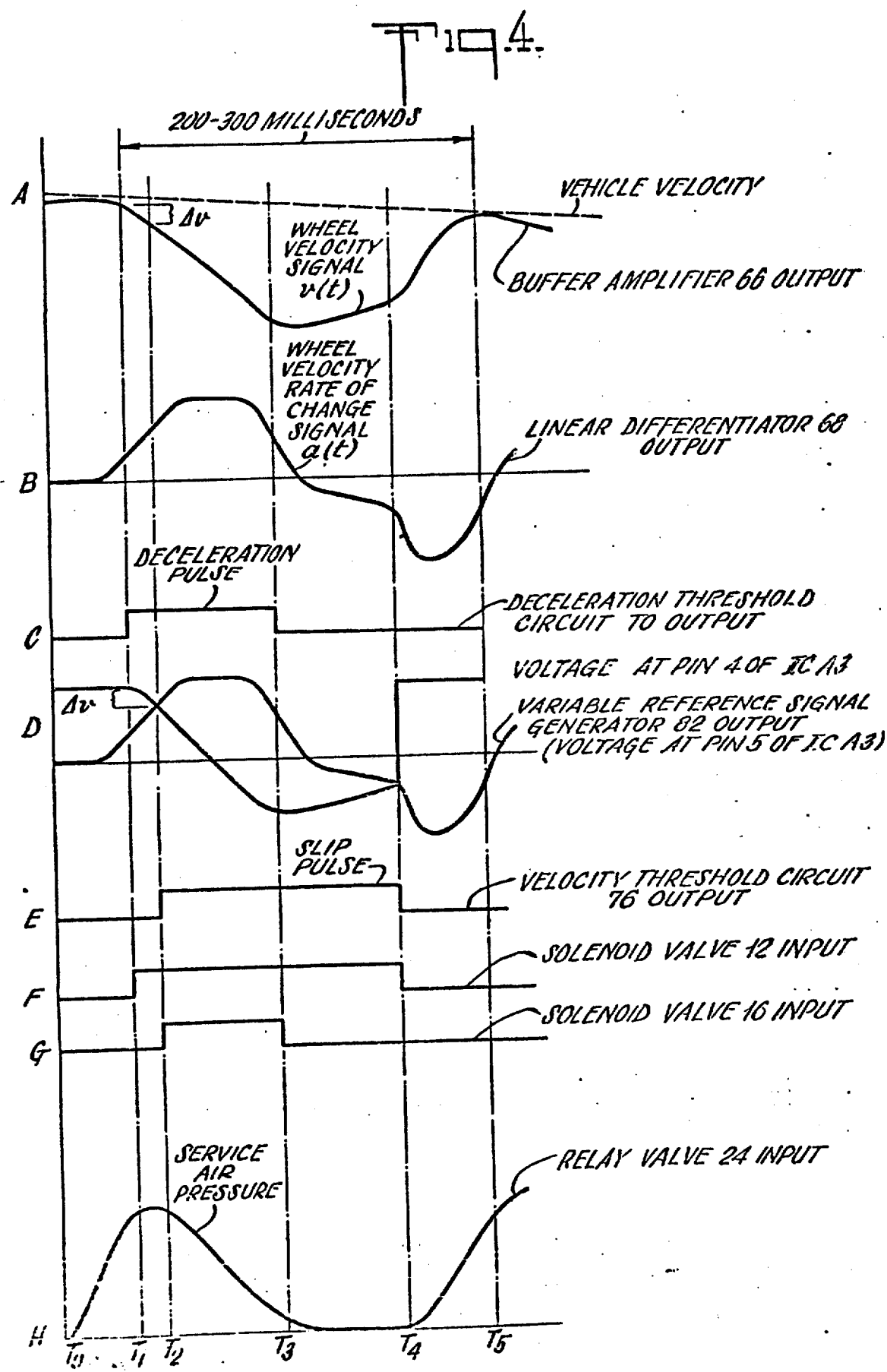

UNITED STATES PATENT OFFICE
CERTIFICATE OF CORRECTION

Patent No. 3,827,760  Dated August 6, 1974

Inventor(s) Joseph E. Fleagle  Page 1 of 2

It is certified that error appears in the above-identified patent and that said Letters Patent are hereby corrected as shown below:

Figure 4 should appear as shown on the attached sheet.

This certificate supersedes Certificate of Correction issued February 3, 1976.

Signed and Sealed this twenty-fifth Day of May 1976

[SEAL]

Attest:

RUTH C. MASON
Attesting Officer

C. MARSHALL DANN
Commissioner of Patents and Trademarks